United States Patent
Li et al.

(10) Patent No.: US 11,921,644 B2
(45) Date of Patent: Mar. 5, 2024

(54) OPTIMIZING HUGE PAGE MANAGEMENT

(71) Applicant: Western Digital Technologies, Inc., San Jose, CA (US)

(72) Inventors: Qing Li, Milpitas, CA (US); Cyril Guyot, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/749,711

(22) Filed: May 20, 2022

(65) Prior Publication Data
US 2023/0376423 A1 Nov. 23, 2023

(51) Int. Cl.
*G06F 12/122* (2016.01)
*G06F 12/0891* (2016.01)

(52) U.S. Cl.
CPC ........ *G06F 12/122* (2013.01); *G06F 12/0891* (2013.01)

(58) Field of Classification Search
None
See application file for complete search history.

(56) References Cited

U.S. PATENT DOCUMENTS

| | | |
|---|---|---|
| 9,841,918 B2 | 12/2017 | Erez et al. |
| 10,261,820 B2 | 4/2019 | Tsirkin et al. |
| 10,552,379 B2 | 2/2020 | Ram |
| 10,691,362 B2 | 6/2020 | Tsirkin et al. |
| 10,789,003 B1 | 9/2020 | Sun et al. |
| 11,513,902 B1 * | 11/2022 | Smaldone ........... H04L 67/1097 |
| 2013/0198471 A1 * | 8/2013 | Tsuchiya ............. G06F 16/1748 711/162 |
| 2015/0052287 A1 * | 2/2015 | Venkatasubramanian ................... G06F 12/0891 711/6 |
| 2020/0310667 A1 | 10/2020 | Sun et al. |
| 2021/0271397 A1 | 9/2021 | Wu et al. |
| 2022/0043592 A1 * | 2/2022 | Yamashita ............ G06F 3/0608 |

* cited by examiner

*Primary Examiner* — Stephanie Wu
(74) *Attorney, Agent, or Firm* — Armstrong Teasdale LLP (57) ABSTRACT

Various processes for efficiently and effectively managing huge pages include a process for optimizing memory deduplication of huge pages, optimizing the promotion of one or more base pages to one or more huge pages and optimizing memory compaction of a memory space associated with a huge page.

20 Claims, 5 Drawing Sheets

OPTIMIZING HUGE PAGE MANAGEMENT

BACKGROUND

In current computing devices, a processor uses a page table to translate a virtual address in virtual memory to a corresponding physical address in a physical memory device. A translation lookaside buffer (TLB) caches recently used address translations in order to reduce an amount of time it takes to subsequently access a particular memory location in the physical memory device. While a TLB hit may improve the overall performance of the computing device, a TLB miss may severely impact the performance of the computing device.

The capacity of physical memory devices, and associated page tables, continues to increase. However, a TLB has a fixed number of slots in which to store address translations and has not grown on the same scale as physical memory devices. Thus, with the increase in size of physical memory devices, the risk of TLB misses also increases.

In order to remedy the above, a computing device may utilize huge pages. Huge pages reduce the number of page table entries required to cover large memory spaces thereby reducing the threat of a TLB miss. However, current computing devices do not efficiently manage huge pages, which may lead to memory bloat, memory fragmentation and increased page latency.

Accordingly it would be beneficial for a computing device to exploit the benefits of huge pages while overcoming the shortcomings described above.

SUMMARY

The present application describes a system and methods for managing huge pages. For example, the system and methods described herein manage huge pages by executing a deduplication process that removes redundant base pages from a huge page. In an example, the deduplication process considers a duplication ratio of the base pages as well as an access frequency of the base pages. The present application also describes a promotion scheme to determine when and which base pages to promote to huge pages. The present application also describes a compaction scheme that is used to efficiently reclaim pages.

Accordingly, the present application describes a method for determining whether a memory region is a candidate for a deduplication process. In an example, the method includes determining a duplication ratio associated with the memory region. In an example, determining the duplication ratio of the memory region includes selecting one sampled page associated with the memory region at a first sample interval. A fingerprint of the sampled page is determined to estimate the duplication ratio of the memory region. An access frequency associated with the memory region is also determined. In an example, determining the access frequency of the memory region includes sampling one or more pages associated with the memory region at a second sample interval and determining whether each of the one or more pages has been accessed. The memory region may be identified as a deduplication candidate when the duplication ratio of the memory region is above a duplication ratio threshold and the access frequency associated with the memory region is below an access frequency threshold.

The present application also describes a system for determining whether a memory region is a candidate for a deduplication process. In an example, the system includes a processor and a memory communicatively coupled to the processor. The memory stores instructions that, when executed by the processor, perform operations. In an example, the operations include determining a duplication ratio associated with the memory region. In an example, the duplication ratio is determined by determining a fingerprint of one sampled page at a first sample interval. A fingerprint of the sampled page is determined to estimate the duplication ratio of the memory region. An access frequency associated with the memory region is also determined. The access frequency may be determined by identifying a page associated with the memory region at a second sample interval and determining, based on access information associated with the page, whether the page has been accessed.

Also described herein is a system for determining whether a memory region is a candidate for a deduplication process. The system may include a processing means, a storage means communicatively coupled to the processing means, a duplication determination means and an access frequency determination means. In an example, the duplication determination means determines a duplication ratio associated with the memory region by determining a fingerprint of a sampled page at a first sample interval. The access frequency determination means determines an access frequency associated with the memory region by identifying a page associated with the memory region at a second sample interval and determining, based on access information associated with the page, whether the page has been accessed.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As workloads of computing devices continue to increase, address translation overhead also increases. For example, a processor of a computing device may use a page table to translate a virtual address in virtual memory to a corresponding physical address in RAM or another physical memory device. A translation lookaside buffer (TLB) caches recently used address translations. However, the size of TLBs has not scaled at the same rate as the size of memory devices. To reduce the amount of TLB misses, computing devices may utilize huge pages.

A huge page is comprised of a fixed number of contiguous base pages. For example, a huge page may include five hundred twelve 4 KB base pages. As a result, the huge page may comprise a 2 MB region of memory. As such, the TLB may store one 2 MB page entry that covers a contiguous 2 MB region of memory instead of storing five hundred twelve 4 KB entries to cover the same region of memory. Although five hundred twelve base pages is specifically mentioned, the huge page may include any number (e.g., two or more) of base pages.

However, current computing systems do not effectively manage huge pages. For example, use of huge pages often leads to memory bloat (e.g., a situation in which a process or application reserves more memory than it uses, resulting in an increased memory footprint) and/or memory fragmentation. In another example, use of huge pages causes page latency issues. For example, when a huge page is allocated, each base page that makes up the huge page must be cleaned. If a huge page utilizes five hundred twelve base pages, the system has to clean each of the five hundred twelve base pages individually.

In order to address the above, the present application describes various approaches to effectively manage huge pages. Although the term "huge page" is used herein, huge page refers to any combination of 4 KB base pages and may be used interchangeably with "large page" and/or "super page."

In order to effectively manage huge pages, the present application describes a deduplication process that removes redundant base pages from the huge page. The present application also describes a promotion process to determine when to promote base pages (e.g., 4 KB base pages) to huge pages and which base pages to promote. The present application also describes a compaction process to efficiently reclaim pages.

As will be explained in greater detail below, the deduplication process improves current deduplication processes. For example, the deduplication process described herein improves upon the known Ultra Kernel Same-page Merging (UKSM) deduplication process by considering a duplication ratio of the base pages associated with a huge page as well as an access frequency of the base pages associated with the huge page.

Currently, UKSM scans and organizes memory regions (e.g., virtual memory regions) into a memory region hierarchy. According to UKSM, a memory region higher in the memory region hierarchy is more likely to be a deduplication candidate. As such, UKSM adaptively promotes or demotes a memory region in the memory region hierarchy according to: a determined duplication ratio, a determined repetition ratio, a determined lifetime of pages, and an update history.

When a memory region is deduplicated, UKSM enables transparent page sharing and subsequently breaks the huge page associated with the memory region into its base pages. However, because UKSM does not consider an access frequency of the base pages or the huge page when identifying deduplication candidates, UKSM may cause high overhead for a Memory Management Unit (MMU) and/or a low hit ratio in a TLB when the huge page is broken into its base pages and the base pages are subsequently accessed.

The present application also describes a base page promotion process that improves on current base page promotion processes. For example, the base page promotion process described herein tracks an access frequency and utilization metrics of huge page sized regions and also predicts huge page usage trends. As such, the base page promotion process of the present disclosure may promote frequently accessed and highly utilized base pages to huge pages.

The present application also describes a compaction process that improves current memory compaction algorithms in order to efficiently and effectively reclaim more pages and reduce fragmentation. For example, current memory compaction algorithms use a migration scanner to find pages in a memory area that are migratable. The migration scanner starts at the start of the memory area and scans to the end of the memory area. Likewise, a free scanner scans the memory area to find free pages. The free scanner scans from the end of the memory area to the start of the memory area. Pages that the migration scanner identifies as being migratable may be moved to free pages found by the free scanner. When both scanners meet, compaction is complete.

However, the above scanning process is not efficient in that free pages passed over by the migrate scanner and migratable pages passed over by the free scanner are not identified. Thus, migratable pages that were passed over by the free scanner are not compacted and the memory area may be still fragmented. In order to address the above, the compaction algorithm of the present application enables the migration scanner and the free scanner to identify migratable pages and free pages in order to compact pages more efficiently.

Thus the present application describes many technical benefits including enabling a computing device to effectively and efficiently manage huge pages. Additionally, managing and/or using huge pages efficiently and effectively can help improve system performance by reducing an amount of system resources required to access page table entries and/or reduce the amount of resources required to maintain huge pages. Managing and/or using huge pages efficiently and effectively can also help reduce TLB misses thereby increasing system performance. Managing and/or using huge pages efficiently and effectively can also alleviate issues that lead to memory bloat, memory fragmentation and increased page latency.

These various benefits and examples will be described in greater detail below with reference to FIG. 1-FIG. 5B.

Figure 1:
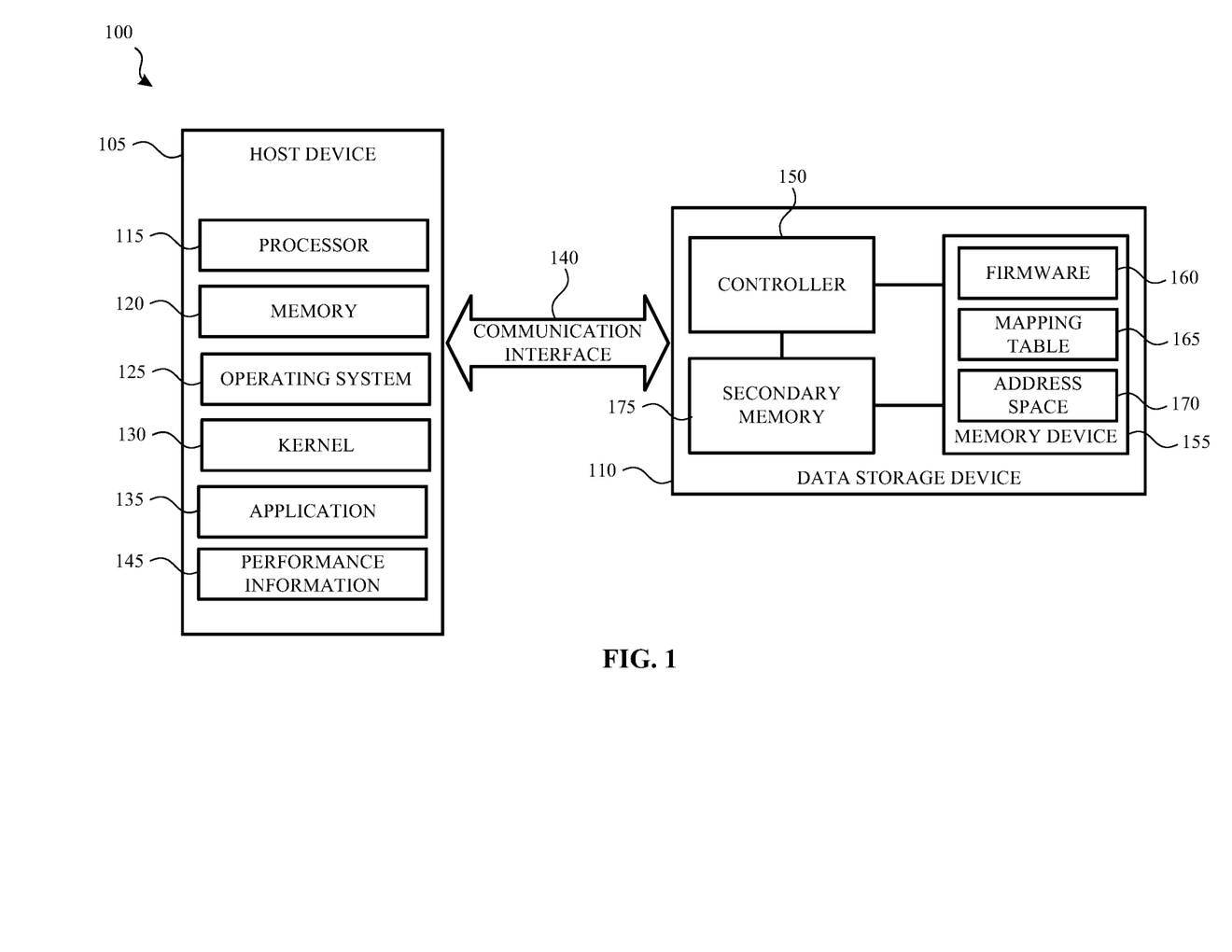
FIG. 1 is a block diagram of a system that may be used to execute the various processes described herein according to an example.

FIG. 1 is a block diagram of a system 100 that includes host device 105 and a data storage device 110 according to an example. The host device 105 and/or the data storage device 110 may be used to optimize huge pages using the various methods and processes described herein. In an example, the host device 105 includes a processor 115 and a memory device 120 (e.g., main memory). The memory device 120 may include an operating system 125, a kernel 130 and/or an application 135.

The processor 115 can execute various instructions, such as, for example, instructions from the operating system 125 and/or the application 135. The processor 115 may include circuitry such as a microcontroller, a Digital Signal Processor (DSP), an Application-Specific Integrated Circuit (ASIC), a Field Programmable Gate Array (FPGA), hardwired logic, analog circuitry and/or various combinations thereof. In an example, the processor 115 may include a System on a Chip (SoC).

In an example, the memory device 120 can be used by the host device 105 to store data used by the processor 115. Data stored in the memory device 120 may include instructions provided by the data storage device 110 via a communication interface 140. The data stored in the memory device 120 may also include data used to execute instructions from the operating system 125 and/or one or more applications 135.

The memory device 120 may also store performance information 145 that includes information regarding the performance of one or more huge pages utilized by the system 100. For example, the performance information 145 may include information about duplicated pages, when memory should be compacted, when pages should be promoted to huge pages and the like. In an example, the memory 120 is volatile memory, such as, for example, Dynamic Random Access Memory (DRAM).

In an example, the operating system 125 may create a virtual address space for the application 135 and/or other processes executed by the processor 115. The virtual address space may map to locations in the memory device 120. The operating system 125 may include or otherwise be associated with a kernel 130. The kernel 130 may include instructions for managing various resources of the host device 105 (e.g., memory allocation), handling read and write requests, and/or determining when the execute the various methods and processes described herein related to huge page management.

The communication interface 140 communicatively couples the host device 105 and the data storage device 110. The communication interface 140 may be a Serial Advanced Technology Attachment (SATA), a PCI express (PCIe) bus, a Small Computer System Interface (SCSI), a Serial Attached SCSI (SAS), Ethernet, Fibre Channel, or WiFi. As such, the host device 105 and the data storage device 110 need not be physically co-located and may communicate over a network such as a Local Area Network (LAN) or a Wide Area Network (WAN), such as the internet. In addition, the host device 105 may interface with the data storage device 110 using a logical interface specification such as Non-Volatile Memory express (NVMe) or Advanced Host Controller Interface (AHCI).

The data storage device 110 includes a controller 150 and a memory device 155. The memory device 155 may be Storage Class Memory (SCM). The data storage device 110 may also include secondary memory 175. The controller 150 may include circuitry for executing instructions. The instructions may originate from firmware 160 associated with the data storage device 110. In another example, the instructions may originate from the host device 105. Accordingly, the controller 150 may include circuitry such as one or more processors, a microcontroller, a DSP, an ASIC, an FPGA, hard-wired logic, analog circuitry and/or a combination thereof. In another example, the controller 150 may include a SoC.

The secondary memory 175 may be a rotating magnetic disk or non-volatile solid-state memory, such as flash memory. While the description herein refers to solid-state memory generally, it is understood that solid-state memory may comprise one or more of various types of memory devices such as flash integrated circuits, NAND memory (e.g., single-level cell (SLC) memory, multi-level cell (MLC) memory (i.e., two or more levels), or any combination thereof), NOR memory, EEPROM, other discrete Non-Volatile Memory (NVM) chips, or any combination thereof.

In some examples, the memory device 155 is capable of storing data at a byte-addressable level, as opposed to other types of non-volatile memory that have a smallest writable data size such as a page size of 4 KB or a sector size of 512 Bytes.

In some examples, the memory device 155 may also store a mapping table 165 and/or an address space 170. In some examples, the controller 150 can associate portions of data stored in the secondary memory 175 with unique identifiers. The unique identifiers may be stored in the memory device 155 and be used by the operating system 125 to access stored data. For example, the mapping table 165 can provide a mapping of unique identifiers with indications of physical locations (e.g., Physical Block Addresses (PBAs)) where the corresponding portions of data are stored in the secondary memory 175.

The memory device 155 may also include address space 170. The address space 170 can serve as at least a portion of an address space used by the processor 115. In an example, the address space 170 can store data at a byte-addressable level that can be accessed by the processor 115 (e.g., via the communication interface 140).

For example, the data storage device 110 may provide the host device 105 with an indication of the address space 170. The host device 105 may then associate an address range for the address space 170 and an indication that this address range is to be used as a byte-addressable address space, such as for a page cache.

In another example, the host device 105 may manage the data storage device 110 such that the processor 115 can directly access address space 170. For example, the data storage device 110 may provide logical to physical address translation information to the host device 105, which can be called by the host device 105 and executed by the processor 115 and/or the controller 150.

Although FIG. 1 illustrates the host device 105 being separate from the data storage device 110, the host device 105 and the data storage device 110, as well the various components described, may be part of a single device or part of multiple devices.

Figure 2:
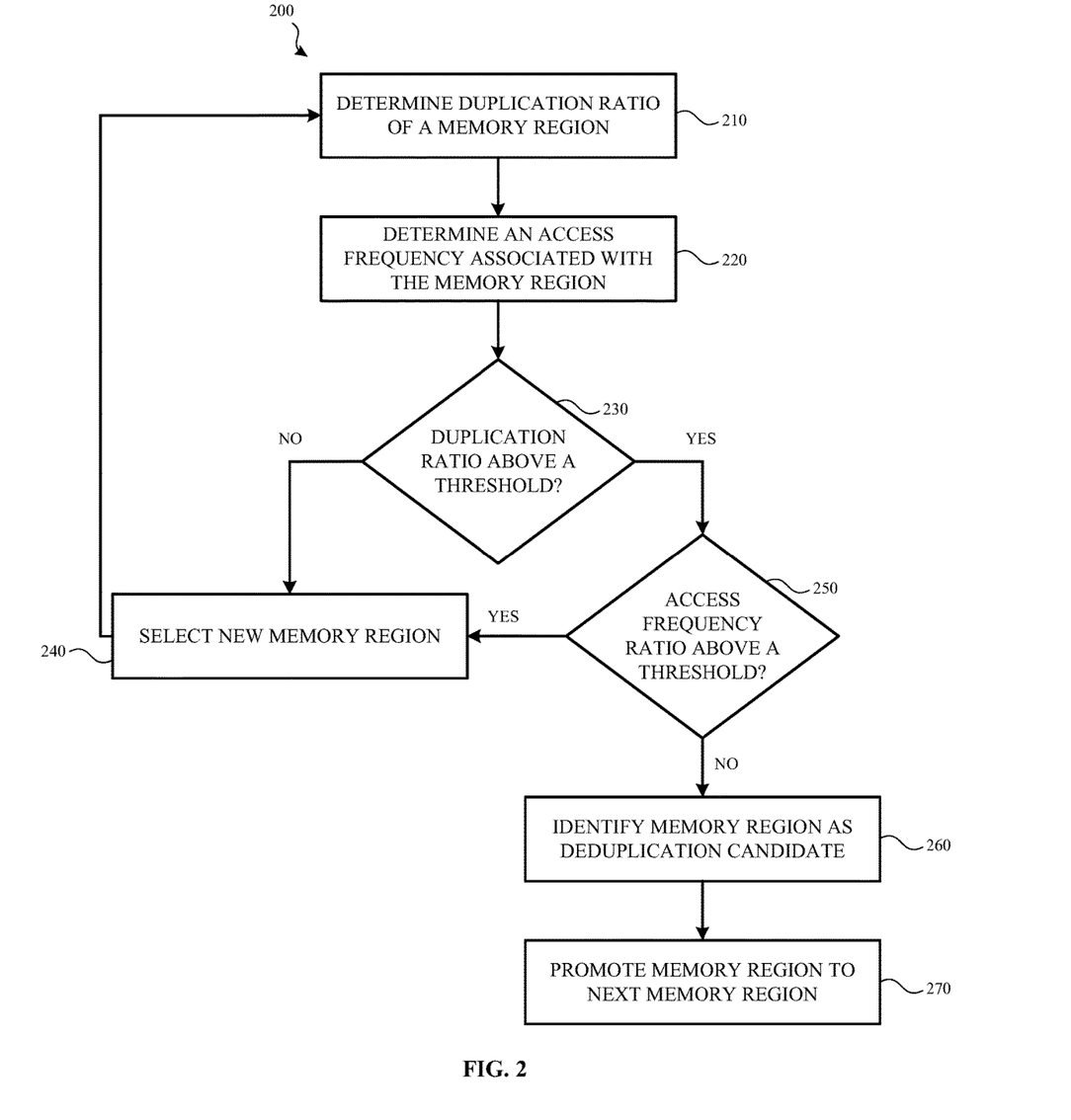
FIG. 2 illustrates a method for performing a deduplication process on a memory region according to an example.

FIG. 2 illustrates a method 200 for performing a deduplication process on a memory region of a memory space according to an example. The deduplication process may be performed by the system 100 or one or more subsystems of the system 100 shown and described with respect to FIG. 1.

Method 200 begins when a duplication ratio of a memory region of a memory space is determined (210). In an example, a memory region is a continuous virtual memory region allocated by an application. In another example, the memory region may be a memory region specified by, or otherwise associated with, a huge page. In an example, the duplication ratio of the memory region is determined using at least a portion of the UKSM deduplication algorithm. A brief explanation of the UKSM deduplication algorithm is included below.

According to UKSM, the duplication ratio of a memory region can be estimated by sampling a portion of all pages in the memory region and monitoring its degree of dynamics and lifetime. Using this information, sparse, short-lived and frequently COW-broken regions may be distinguishable from statically-duplicated regions.

Figure 3:
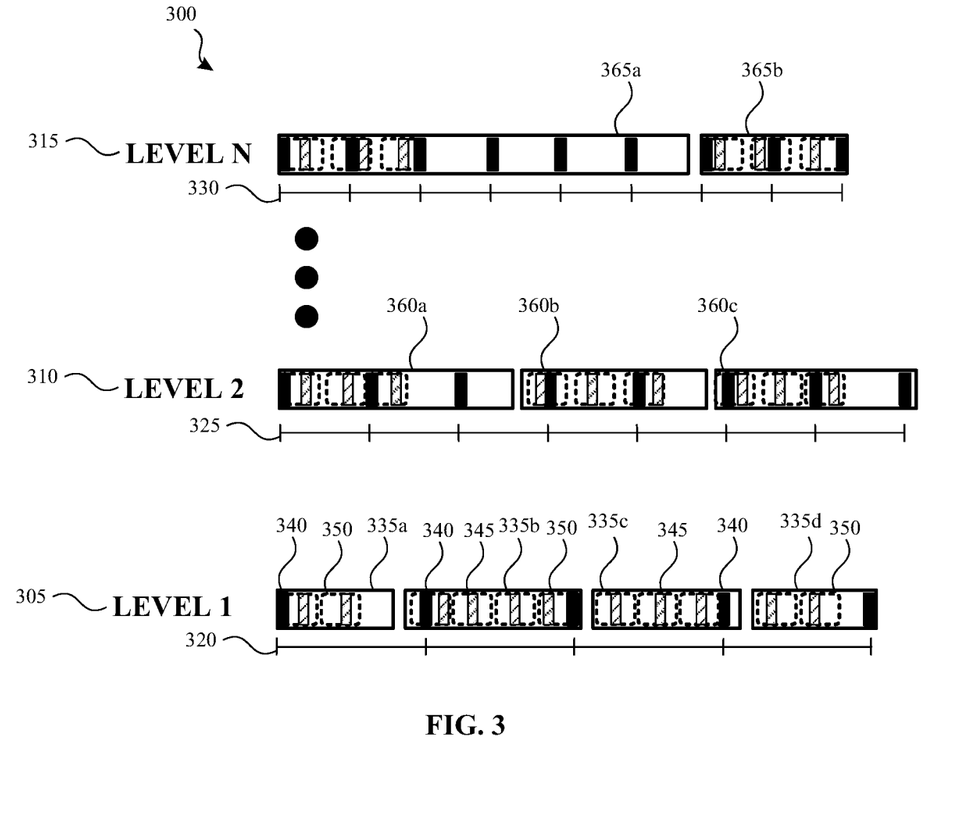
FIG. 3 is a visual diagram that illustrates the deduplication process shown in FIG. 2 according to an example.

In UKSM, the memory regions of a memory space are divided into a memory region hierarchy or sampling levels. Each sampling level includes a linked-list of the memory regions that make up the memory space. For example and referring to FIG. 3, a memory space 300 may include nine different memory regions in various sampling levels. Specifically, and as shown in FIG. 3, the memory space 300 includes a first sampling level (e.g., Level 1 305), a second sampling level (e.g., Level 2 310) and a third sampling level (e.g., Level N 315). Each sampling level includes a number of different memory regions.

For example, Level 1 305 includes four memory regions 335a-335d; Level 2 310 includes three memory regions 360a-360c; and Level N 315 includes two memory regions 365a-365b. In addition, each level is associated with a scanning speed or sample interval. For example, Level 1 305 is associated with a first sample interval 320, Level 2 310 is associated with a second sample interval 325, and Level N 315 is associated with a third sample interval 330. As shown in FIG. 3, the sampling interval decreases (e.g., the frequency of sampling increases) from Level 1 305 to Level N 315.

According to UKSM, key characteristics that indicate duplication qualities of a memory region include a COW ratio ($V_{cow}$), a duplication ratio ($V_{dup}$), and average page lifetime ($V_{life}$) and each characteristic is associated with a threshold. Each threshold may be adjustable. In UKSM, memory regions with a duplication ratio above $V_{dup}$, a COW-broken ratio below $V_{cow}$ and life longer than $V_{life}$ are identified as a candidate for deduplication.

A duplication ratio for a particular memory region is estimated by dividing a duplicate page counter by the number of pages sampled in a given sampling round. To compute the COW ratio, the number of COW-broken page faults on merged pages during a sampling round is determined. The average page lifetime is decided by a sleep time, $T_s$, and the sampling round time t.

To find duplicate base pages, a memory scanner starts at a page offset of zero in Level 1 305 and picks sample pages based on the length of interval. For example and as shown in FIG. 3, base pages (denoted by lines 340) are sampled at the sampling interval 320 associated with Level 1 305.

Once the base page is selected, the base page's hash value or fingerprint is determined. In an example, the hash value is based on a current hash strength (i.e., bytes hashed in each page). The hash value or fingerprint is compared against values in two red-black trees in order to determine whether the hash value already exists (e.g., indicating the base page is a duplicate page). One of the red-black trees ($T_{rs}$) tracks the "merged" base pages whereas the other one ($T_{rus}$) records the "unmerged" base pages.

If the sampled base page has an identical page in $T_{rs}$, that particular memory region's duplicate counter is increased by one. If the sampled base page is found to be identical to one of the pages in $T_{rus}$, the base page is moved to $T_{rs}$ and the counters of both regions are increased. Eventually, the page table is updated and redundant base pages are released.

UKSM keeps "merged" and "unmerged" page hashes in separate trees because merged pages should be managed in a read-only tree. A write to any node in the read-only tree causes a COW operation. The scan continues until the sample point reaches the boundary of the linear space (e.g., the end of the memory region 335d of Level 1 305). The scanner then proceeds to the next level and the process repeats.

After each round of sampling, the duplication ratio and a COW ratio of each region are compared with a set of threshold values. If a memory region is identified as a potential statically-duplicated region (e.g., it has a duplication ratio above $V_{dup}$, a COW-broken ratio below $V_{cow}$ and life longer than $V_{life}$), it is promoted from its current level to the next higher level which has a higher scanning speed hence a higher sampling density.

Referring back to FIG. 2, the deduplication process 200 continues by determining (220) an access frequency of pages associated with the memory region. In an example, the page may be considered to have been accessed when the page is written to and/or read from.

In order to determine an access frequency of pages associated with the memory region, the memory region is partitioned into several access frequency intervals. In an example, the access frequency interval is smaller than the sampling interval associated with the particular level. A base page in each access frequency interval is randomly selected and a page table access bit of the base page is checked to determine a "hotness" of the access frequency interval associated with the selected base page.

The page table access bit indicates whether the particular base page has been accessed. If the page table access bit indicates that the base page of the particular access frequency interval has been accessed, it is presumed that other base pages in this particular access frequency interval have also been accessed as base pages in one interval may have similar access patterns.

In some examples, adjacent access frequency intervals are merged into a single access frequency interval if the access patterns of the sampled pages are similar. In another example, an access frequency interval may be split into two smaller access frequency intervals to further isolate "hot" page regions. In such an example, the access frequency intervals may be split into smaller access frequency intervals until a maximum number of access frequency intervals is reached for a particular memory region. The maximum number of access frequency intervals may be bound by idle page tracking in a sleep-scan cyclic system. In an example, the maximum number of access frequency intervals can be adjusted by end-users to bound the CPU/memory overhead.

For example and referring back to FIG. 3, each memory region (e.g., memory region 335a) is partitioned into several different access frequency intervals (indicated by the dashed lines 350). A base page (represented by line 345) in each access frequency interval 350 is randomly selected. The page table access bit of the selected base page 345 is checked to determine a hotness of the access frequency interval 350.

As discussed above, if the page table access bit indicates that the base page 345 of the particular access frequency interval 350 has been accessed, it is presumed that other base pages in this particular access frequency interval 350 have also been accessed. A similar process may be performed on each of the other levels such as shown in FIG. 3. In some examples, the access frequency interval in different levels is the same or substantially the same. In other examples, the access frequency interval of the different levels is different. For example, the access frequency interval used in Level 1 305 may be larger or greater than the access frequency interval used in Level 2 310.

Referring back to FIG. 2, once the duplication ratio of a memory region and the access frequency of the memory region have been determined, a determination (230) is made as to whether the duplication ratio is above a duplication threshold. If the duplication ratio of the memory region is below the duplication threshold, a new memory region is selected (240) and the method 200 may repeat. However, if the duplication ratio is above the duplication threshold, a determination (250) is made as to whether the access frequency ratio of the memory region is above an access frequency threshold.

In examples, the deduplication process of the present disclosure does not deduplicate memory regions that are more frequently accessed when compared to other memory regions—even if a duplication ratio is above a threshold—as deduplicating memory regions that are frequently accessed may cause high overhead for a MMU and/or a low hit ratio in a TLB when the base pages of the memory region are subsequently accessed. Accordingly, if it is determined that the access frequency ratio is above the access frequency ratio (e.g., the pages associated with the memory region are hot), a new memory region is selected (240) and the method 200 may repeat.

However, if it is determined that the access frequency ratio of the memory region is below the access frequency threshold (e.g., the pages are not hot or are cold), the memory regions is identified (260) as a potential deduplication candidate. As such, the memory region is promoted (270) to the next memory region.

For example and referring back to FIG. 3, if it is determined (e.g., based on the duplication ratio and/or the access frequency ratio) that memory region 335b in Level 1 305 is a candidate for deduplication, memory region 335b may be promoted from Level 1 305 to Level 2 310. However, the reverse is also true. For example, if it is determined (e.g., based on the duplication ratio and/or the access frequency ratio) that memory region 360a in Level 2 310 is not a candidate for deduplication, memory region 360a may be demoted from Level 2 310 to Level 1 305.

Although method 200 specifically mentions determining a duplication ratio and an access frequency ratio to determine whether a particular memory regions is a candidate for a deduplication process, other factors may be considered. For example, a memory region with a duplication ratio above a duplication threshold, a COW-broken ratio below a COW ratio, an average page lifetime greater than a lifetime threshold and/or an access frequency ratio below an access frequency threshold may be considered a deduplication candidate. However, in some cases, regardless of the other factors, a memory region with an access frequency ratio above the access frequency threshold may rarely, if ever, be considered a deduplication candidate.

Referring back to FIG. 3, in some examples, the memory regions in each level of the memory space 300 are sequentially scanned. For example, memory region 335a in Level 1 305 may be scanned first, followed by memory region 335b and so on. In another example, the memory regions may be scanned in a random order.

However, the deduplication process described herein seeks to minimize the number of scans that are performed on the various memory regions of a memory space 300. As such, the deduplication process of the present disclosure selects scanning candidates based on a metric of duplication ratio and/or hotness.

For example, once a memory region has been scanned, a memory management unit may randomly select two different memory regions in a particular level and determine and/or calculate (e.g., based on a random sample of one or more pages and comparing the sampled pages to pages that are stored in a red-black tree to determine a duplication ratio) a likelihood that each memory region has a duplication ratio above a duplication threshold and and/or has an access frequency ratio below the access frequency threshold. The memory region with the highest potential gain may be selected for scanning.

Although a duplication ratio and an access frequency ratio are specifically mentioned, a COW-broken ratio and an average page lifetime may also be considered. For example, a memory region having a duplication ratio above a duplication threshold, a COW-broken ratio below a COW ratio, an average page lifetime greater than a lifetime threshold and/or an access frequency ratio below an access frequency threshold may be considered as a preferred scanning candidate.

Another improvement of the deduplication process described herein includes avoiding redundant page zeroing. For example, when a huge page is allocated to an application, all of the consecutive base pages that make up the memory region associated with the huge page must be cleaned or zeroed.

However, when a huge page is deduplicated, some or all of the base pages are cleaned or zeroed. The base pages may subsequently be used to create another huge page. However, since the base pages that were deduplicated are already clean, the deduplication process described herein adds a flag or other indicator to a base page when the base page is identified as a zero page during a deduplication process. That way, if the base page is subsequently selected to be part of another huge page, the memory associated with the base page will not be cleaned again (it was cleaned already during the deduplication process) and page latency will be reduced. The flag or other indicator associated with the base page may be reset when the base page is freed.

Figure 4:
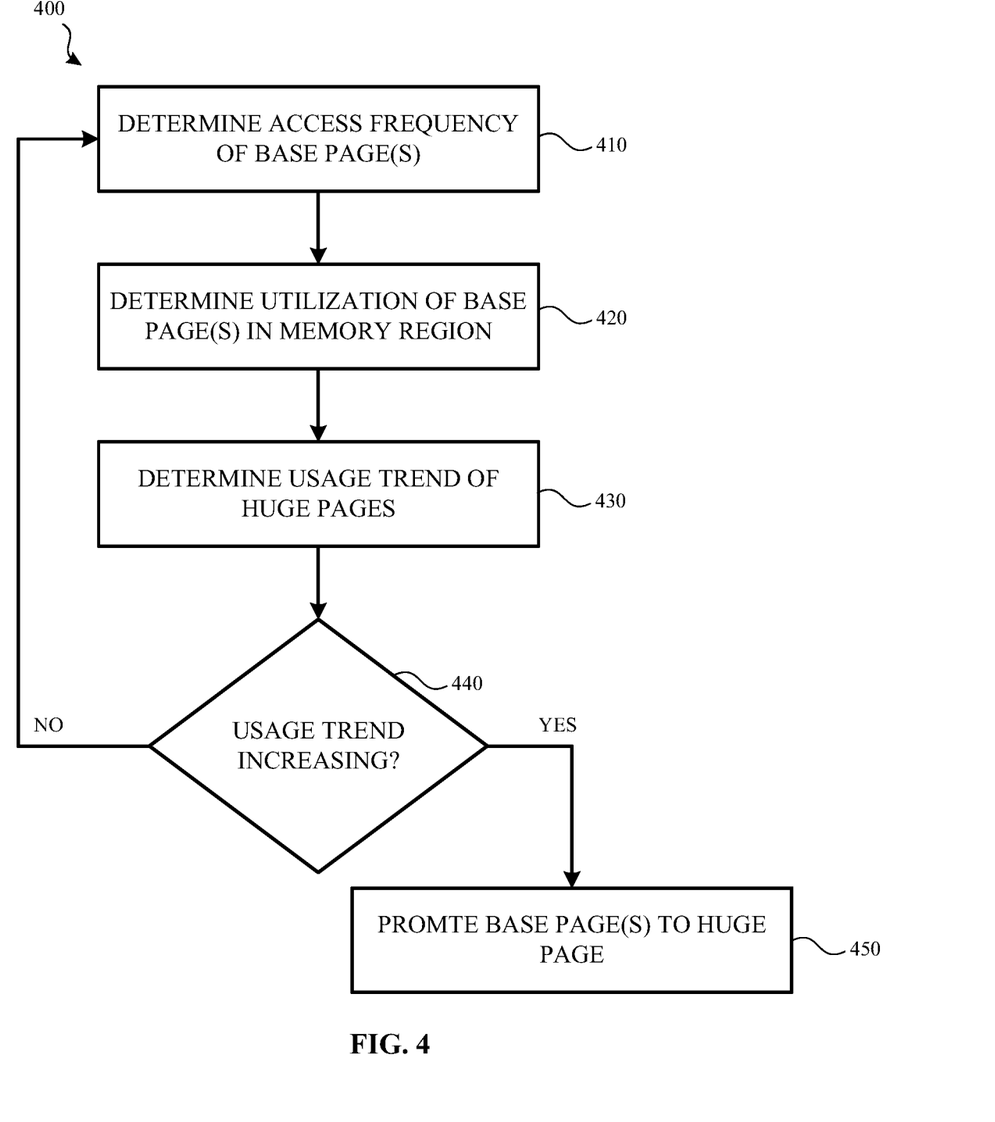
FIG. 4 illustrates a method for optimizing asynchronous promotion of base pages to huge pages according to an example.

FIG. 4 illustrates a method 400 for optimizing asynchronous promotion of base pages to huge pages according to an example. In an example, the method 400 may be performed by the system 100, or one or more subsystems of the system 100, shown and described with respect to FIG. 1.

Method 400 begins when the system tracks or otherwise determines (410) an access frequency of one or more base pages associated with a memory region. The memory region may contain or otherwise be associated with up to five hundred twelve base pages. In another example, the memory region may contain or otherwise be associated with more than five hundred twelve pages or fewer than five hundred twelve pages.

In an example, the access frequency of the one or more base pages may be tracked by sampling a page table access bit of one or more randomly selected base pages associated with a memory region. For example, the system may partition each memory region (e.g., a virtual memory area) into several disjointed intervals for page access information sampling. The system may then sample the page table access bit of one random page within each interval to estimate the hotness of the entire interval (based on an understanding that pages within one interval present similar access patterns). The system may then merge adjacent intervals into a single interval if their access patterns are similar. Likewise, the system may randomly split each interval into two smaller intervals to further isolate hot page regions until the maximal number of intervals is reached for the whole memory region. If the access frequency information associated with the one or more base pages indicates that over a threshold amount of base pages are hot (e.g., the base pages are frequently accessed over a period of time), the one or more base pages may be candidates for promotion to a huge page.

Once the access frequency of the one or more base pages is determined, a utilization of the one or more base pages associated with the memory region is determined (420). In some examples, the utilization of the one or more base pages is stored in a bitmap. The bitmap may include five hundred twelve bits. Each bit in the bitmap represents a base page in the memory region. If the bitmap indicates that over a threshold amount of base pages are allocated, the one or more base pages may be candidates for promotion to a huge page.

Method 400 continues by determining (430) a usage trend of some or all of the huge pages that are currently allocated. In an example, the usage trend is determined for a fixed amount of time. For example, a function $f(t)$ is used to predict the number of free huge pages at different moments in time along with a current timestamp t. The usage trend is obtained by periodically collecting data associated with the number of free huge pages and fitting a line to these points using a least square regression method.

If the slope of line is negative, the number of free huge pages is decreasing. As such, it may be determined (440) that the usage trend of huge pages is increasing. Accordingly, the one or more base pages may be promoted (450) to a huge page.

However, if the slope of the line is positive, the number of free huge pages either constant or is increasing. As such, it may be determined (440) that the usage trend of huge pages is not increasing. Accordingly, the one or more base pages are not promoted to huge page at this time and the method 400, or portions thereof, may be repeated.

Figure 5A:
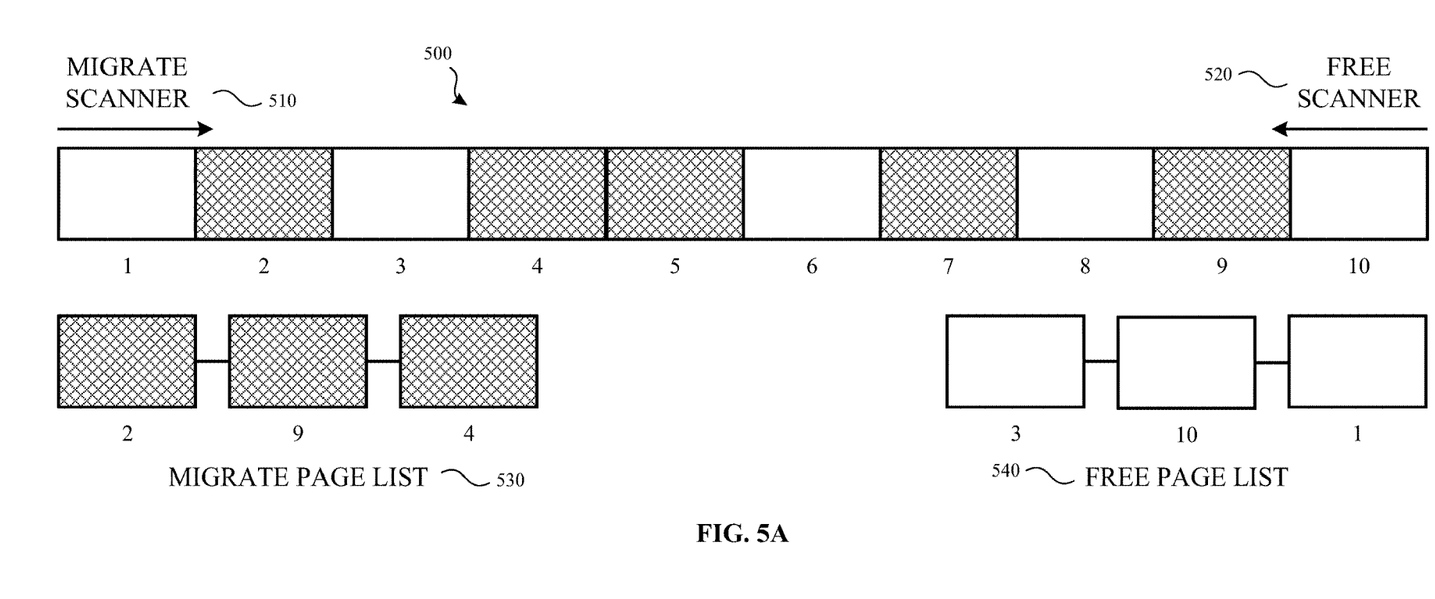
FIG. 5A illustrates an example memory space before a compaction process is performed according to an example.

FIG. 5A illustrates a memory compaction process that may be implemented by the system 100, or one or more subsystems of the system 100, shown and described with respect to FIG. 1.

The memory compaction process may be performed on a memory space 500. In the example shown, the memory space 500 includes ten pages labeled 1-10. Although ten pages are shown and described, the memory space 500 may include any number of pages. As also shown in FIG. 5, some of the pages are free and some of the pages are being used but may be moved. For example, the free pages are the white pages 1, 3, 6, 8 and 10 and the migratable/moveable pages are filled pages 2, 4, 5, 7 and 9.

The memory compaction process utilizes a migrate scanner 510 and a free scanner 520. During a compaction process, the migrate scanner 510 starts at the start of the memory space 500 and scans to the end of the memory space 500. Likewise, the free scanner 520 scans from the end of the memory space 500 to the start of the memory space 500. In contrast to current solutions in which a migrate scanner only scans for migratable or moveable pages and a free scanner only scans for free pages, the migrate scanner 510 and the free scanner 520 of the present disclosure identify both free pages and migratable pages.

For example, as the migrate scanner 510 moves from the start of the memory space 500 toward the end of the memory space, the migrate scanner 510 may identify page 1 and page 3 as free pages and identify page 2 and page 4 as migratable pages. As such, page 1 and page 3 are included in a free page list 540 and page 2 and page 4 are included in a migrate page list 530. Likewise, as the free scanner 520 moves from the end of the memory space 500 to the start of the memory space 500, the free scanner 520 may identify page 10 as a free page and page 9 as a migratable page. As such, page 10 is included in the free page list 540 and page 9 is included in the migrate page list 530. The migrate scanner 510 and the free scanner 520 may scan pages until they meet.

Figure 5B:
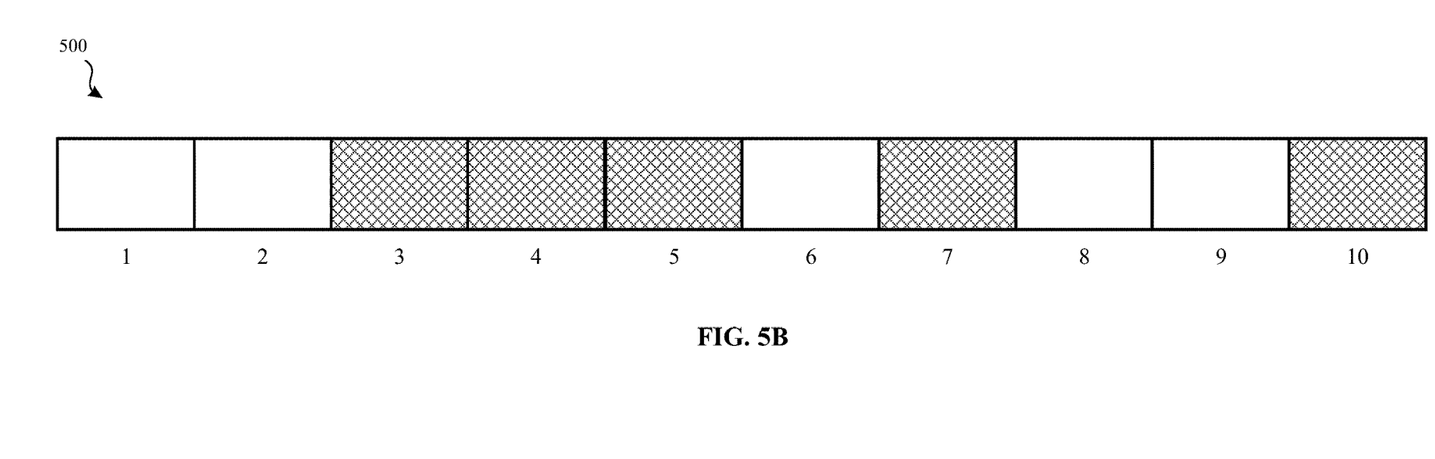
FIG. 5B illustrates the example memory space of FIG. 5A after a compaction process has occurred according to an example.

When the memory space 500 is to be compacted, a determination is made as to which pages should be moved. In the example shown in FIG. 5A, migratable page 2 may be moved to free page 3. As such, page 1 and page 2 will be free and pages 3-5 may be contiguously allocated (such as shown in FIG. 5B). Likewise, in order to free contiguous pages 8-9, migratable page 9 is moved to free page 10. The resulting movement is also shown in FIG. 5B.

In the example shown in FIG. 5A, page 4 is also indicated as being moveable. For example, page 4 may be moveable to free page 1. However, moving page 4 to page 1 will not compact the pages. As such, page 4 will not be moved to page 1.

In some examples, the compaction process described above may occur based on a number of factors. These include, but are not limited to, a huge page trend associated with the memory space. The huge page trend may be similar to the huge page trend described above with respect to FIG. 4. In another example, the compaction process described herein may be initiated based on a Free Memory Fragmentation Index (FMFI) that measures the system memory burden. For example, if the slope of the huge page trend is negative, the number of free huge pages is decreasing. As such, compaction may be initiated. Similarly, if FMFI is below a threshold, the compaction may be initiated.

The term computer-readable media as used herein may include computer storage media. Computer storage media may include volatile and nonvolatile, removable and non-removable media implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by a computing device (e.g., host device 105 (FIG. 1)). Any such computer storage media may be part of the computing device. Computer storage media does not include a carrier wave or other propagated or modulated data signal.

Additionally, examples described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various examples.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks. Additionally, it is contemplated that the flowcharts and/or aspects of the flowcharts may be combined and/or performed in any order.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A method, comprising:
   determining a duplication ratio associated with a memory region, the memory region being associated with a first level in a memory region hierarchy, wherein determining the duplication ratio of the memory region comprises:
   selecting a sampled page associated with the memory region based, at least in part, on a first sample interval;
   determining a fingerprint of the sampled page;
   comparing the fingerprint of the sampled page to a fingerprint of one or more additional pages associated with the memory region to identify duplicate pages; and
   comparing a number of duplicate pages to a number of the one or more additional pages;
   determining an access frequency associated with the memory region, wherein determining the access frequency of the memory region comprises:
   identifying one or more pages associated with the memory region at a second sample interval; and
   determining, based at least in part, on access information associated with each of the one or more pages, whether each of the one or more pages has been accessed;
   identifying the memory region as a deduplication candidate when the duplication ratio of the memory region is above a duplication ratio threshold and the access frequency associated with the memory region is below an access frequency threshold;
   moving the memory region from the first level in the memory region hierarchy to a second level in the memory region hierarchy based, at least in part, on identifying the memory region as the deduplication candidate; and
   determining a second duplication ratio associated with the memory region based, at least in part, on the memory region being moved to the second level in the memory region hierarchy, the second duplication ratio being based, at least in part, on a fingerprint determination of one or more pages selected from the memory region at a third sample interval, wherein the third sample interval is less than the first sample interval.

2. The method of claim 1, further comprising determining a second access frequency associated with the memory region based, at least in part, on the memory region being moved to the second level, the second access frequency being based, at least in part, on access information associated with one or more pages selected from the memory region at a fourth sample interval.

3. The method of claim 1, further comprising performing a deduplication process on one or more pages associated with the memory region.

4. The method of claim 3, wherein performing the deduplication process on the one or more pages associated with the memory region comprises setting a flag for each of the one or more pages, the flag indicating each of the one or more pages is a zero page.

5. The method of claim 1, wherein identifying one or more pages associated with the memory region at the second sample interval comprises randomly selecting a first page based, at least in part, on a first access frequency interval and randomly selecting a second page based, at least in part, on a second access frequency interval.

6. The method of claim 5, further comprising combining the first access frequency interval with the second access frequency interval based, at least in part, on an access pattern associated with the first page and an access pattern associated with the second page.

7. A system, comprising:
   a controller operable to:
   determine a duplication ratio associated with a memory region, the memory region being associated with a first level in a memory region hierarchy and wherein the duplication ration associated with the memory region is determined by:
  determining a fingerprint of a sampled page at a first sample interval;
  comparing the fingerprint of the sampled page to a fingerprint of one or more additional pages associated with the memory region to identify duplicate pages; and
  comparing a number of duplicate pages to a number of the one or more additional pages;
determine an access frequency associated with the memory region by:
  identifying a page associated with the memory region at a second sample interval; and
  determining, based at least in part, on access information associated with the page, whether the page has been accessed;
identify the memory region as a deduplication candidate based, at least in part, on the duplication ratio and the access frequency;
move the memory region from the first level in the memory region hierarchy to a second level in the memory region hierarchy based, at least in part, on identifying the memory region as the deduplication candidate; and
determine a second duplication ratio associated with the memory region based, at least in part, on the memory region being moved to the second level in the memory region hierarchy, the second duplication ratio being based, at least in part, on a fingerprint determination of one or more pages selected from the memory region at a third sample interval, wherein the third sample interval is less than the first sample interval.

8. The system of claim 7, wherein the memory region is identified as the deduplication candidate based, at least in part, on a determination that the duplication ratio of the memory region is above a duplication ratio threshold and the access frequency associated with the memory region is below an access frequency threshold.

9. The system of claim 7, wherein the controller is further operable to:
  perform a deduplication process on one or more pages associated with the memory region.

10. The system of claim 9, wherein performing the deduplication process on the one or more pages associated with the memory region comprises setting a flag for each of the one or more pages, the flag indicating each of the one or more pages is a zero page.

11. The system of claim 7, wherein identifying a page associated with the memory region at the second sample interval comprises randomly selecting the page based, at least in part, on an access frequency interval.

12. The system of claim 11, wherein the controller is further operable to:
  split the access frequency interval into a first access frequency interval and a second access frequency interval based, at least in part, on the access information associated with the page.

13. A system for determining whether a memory region is a candidate for a deduplication process, comprising:
  a processing means;
  a storage means communicatively coupled to the processing means;
  a duplication determination means for determining a duplication ratio associated with the memory region, the memory region being associated with a first level in a memory region hierarchy; and
  an access frequency determination means, wherein:
    the duplication determination means determines a duplication ratio associated with the memory region by:
      determining a fingerprint of a sampled page that was sampled at a first sample interval;
      comparing the fingerprint of the sampled page to a fingerprint of one or more additional pages associated with the memory region to identify duplicate pages; and
      comparing a number of duplicate pages to a number of the one or more additional pages;
    the access frequency determination means determines an access frequency associated with the memory region by:
      identifying a page associated with the memory region at a second sample interval; and
      determining, based on access information associated with the page, whether the page has been accessed;
    wherein the processing means:
      identifies the memory region as a deduplication candidate based, at least in part, on the duplication ratio and the access frequency;
      moves the memory region from the first level in the memory region hierarchy to a second level in the memory region hierarchy based, at least in part, on identifying the memory region as the deduplication candidate; and
      determines a second duplication ratio associated with the memory region based, at least in part, on the memory region being moved to the second level in the memory region hierarchy, the second duplication ratio being based, at least in part, on a fingerprint determination of one or more pages selected from the memory region at a third sample interval, wherein the third sample interval is less than the first sample interval.

14. The system of claim 13, wherein identifying the page associated with the memory region at the second sample interval comprises randomly selecting a first page based, at least in part, on a first access frequency interval and randomly selecting a second page based, at least in part, on a second access frequency interval.

15. The system of claim 13, wherein the processing means identifies the memory region as the deduplication candidate based, at least in part, a determination that the duplication ratio of the memory region is above a duplication ratio threshold and the access frequency associated with the memory region is below an access frequency threshold.

16. The system of claim 15, further comprising a deduplication means for deduplicating the memory region in response to the memory region being identified as the deduplication candidate.

17. The system of claim 13, wherein the processing means determines a second access frequency associated with the memory region based, at least in part, on the memory region being moved to the second level, the second access frequency being based, at least in part, on access information associated with one or more pages selected from the memory region at a fourth sample interval.

18. The system of claim 13, wherein the processing means performs a deduplication process on one or more pages associated with the memory region.

19. The system of claim 18, wherein performing the deduplication process on the one or more pages associated with the memory region comprises setting a flag for each of the one or more pages, the flag indicating each of the one or more pages is a zero page.

20. The system of claim 7, wherein the memory region one of a continuous virtual memory region or a memory region associated with a huge page.

* * * * *